United States Patent
Ikeda et al.

(10) Patent No.: US 6,828,046 B2
(45) Date of Patent: Dec. 7, 2004

(54) SOFT MAGNETIC FILM OF FECOMO HAVING A HIGH SATURATION FLUX DENSITY, A MODERATE SOFT MAGNETISM AND A UNIAXIAL MAGNETIC ANISOTROPY

(75) Inventors: Shoji Ikeda, Kawasaki (JP); Ikuya Tagawa, Kawasaki (JP); Yuji Uehara, Kawasaki (JP); Yoshinori Ohtsuka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 7 days.

(21) Appl. No.: 09/960,419

(22) Filed: Sep. 21, 2001

(65) Prior Publication Data
US 2002/0150790 A1 Oct. 17, 2002

(30) Foreign Application Priority Data
Apr. 13, 2001 (JP) .................................. 2001-116021

(51) Int. Cl.⁷ .................................................. G11B 5/33
(52) U.S. Cl. .................... 428/692; 428/611; 428/668; 428/681
(58) Field of Search .................... 428/65.3, 65.6, 428/65.7, 611, 635, 668, 681, 693, 694 T, 694 R, 694 BC, 694 PR, 694 TM, 900; 360/313, 97.01; 204/192.2, 192.11, 192.15, 192.22; 427/127, 130, 132

(56) References Cited

U.S. PATENT DOCUMENTS

| | | | | |
|---|---|---|---|---|
| 5,290,629 A | * | 3/1994 | Kobayashi et al. | 428/635 |
| 5,851,643 A | * | 12/1998 | Honda et al. | 428/635 |
| 6,036,825 A | * | 3/2000 | Umetsu et al. | 204/192.2 |
| 6,120,918 A | | 9/2000 | Osaka et al. | 428/692 |
| 6,210,544 B1 | * | 4/2001 | Sasaki | 428/694 T |
| 6,303,218 B1 | * | 10/2001 | Kamiguchi et al. | 428/694 T |

FOREIGN PATENT DOCUMENTS

| | | |
|---|---|---|
| JP | 5-148595 | 6/1993 |
| JP | 15-251236 | 9/1993 |
| JP | 6-240416 | 8/1994 |
| JP | 9-115729 | 5/1997 |
| JP | 10-270246 | 10/1998 |
| JP | 11-74122 | 3/1999 |
| JP | 11-121232 | 4/1999 |

* cited by examiner

*Primary Examiner*—Stevan A. Resan
(74) *Attorney, Agent, or Firm*—Greer, Burns & Crain, Ltd.

(57) ABSTRACT

A soft magnetic film comprising Fe, Co, a metallic element (M), and oxygen (O) is provided. The soft magnetic film is represented by a composition formula of $(Fe_{1-a}Co_a)_x M_y O_z$. The metallic element (M) is one selected from a group consisting of Al, B, Ga, Si, Ge, Y, Ti, Zr, Hf, V, Nb, Ta, Cr, Mo, W, Rh, Ru, Ni, Pd and Pt, or is an alloy composed of at least two selected from this group. The composition formula fulfills the following conditions: a=0.05–0.65; y=0.2–9 at %, z=1–12 at %, and y+z=<15 at %; and x=(100−y−z) at %. A crystal structure is formed by having a bcc phase as a principal phase. The bcc phase has a crystal grain not exceeding 50 nm in diameter. The bcc phase includes a solid solution of the metallic element (M) and the oxygen (O).

21 Claims, 14 Drawing Sheets

FIG. 6

| | Film structure | | Hce (Oe) |
|---|---|---|---|
| ① | (Fe77.7Co19.5Al0.6O2.2) 0.5 μm | As-deposited | 15 |
| ② | " | Annealed at 220°C | 7 |
| ③ | (Fe77.7Co19.5Al0.6O2.2) 0.5 μm / (Ni50Fe50) 1.6 μm | As-deposited | 4 |
| | " | Annealed at 220°C | 2 |
| ④ | (Ni50Fe50) 3nm / (Fe77.7Co19.5Al0.6O2.2) 0.5 μm | As-deposited | 10 |
| ⑤ | (Ni80Fe20) 3nm / (Fe77.7Co19.5Al0.6O2.2) 0.5 μm | As-deposited | 8 |
| ⑥ | (Ni80Fe20) 3nm / (Fe77.7Co19.5Al0.6O2.2) 0.5 μm / (Ni50Fe50) 1.6 μm | As-deposited | 1 |

FIG. 11

| Alloy composition (at%) | | | | Sputtering pressure (Pa) | Residual stress $\sigma$ ($10^9$ dyne/cm$^2$) | Hkh (Oe) |
|---|---|---|---|---|---|---|
| Fe | Co | Al | O | | | |
| 71.3 | 18.1 | 2.5 | 8.1 | 0.5 | −5.2 | 47.1 |
| 71.8 | 18.1 | 2.3 | 7.8 | 0.7 | −0.9 | 25.5 |

FIG. 13A PLATING (NiFe,CoNiFe)
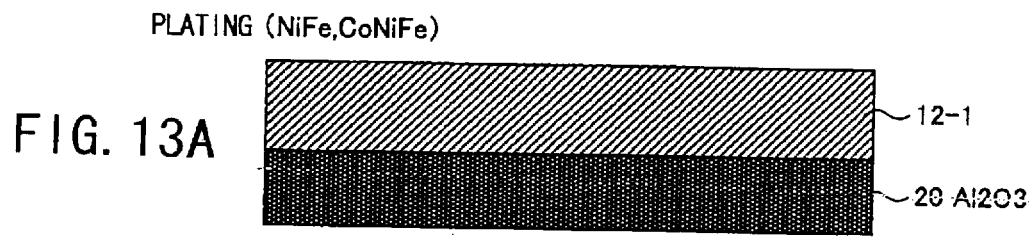
FIG. 13B FeCoMo FILM FORMATION BY SPUTTERING
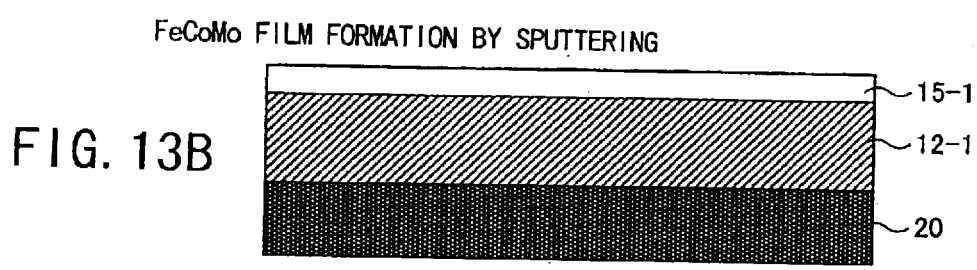
FIG. 13C Al₂O₃ GAP LAYER FORMATION
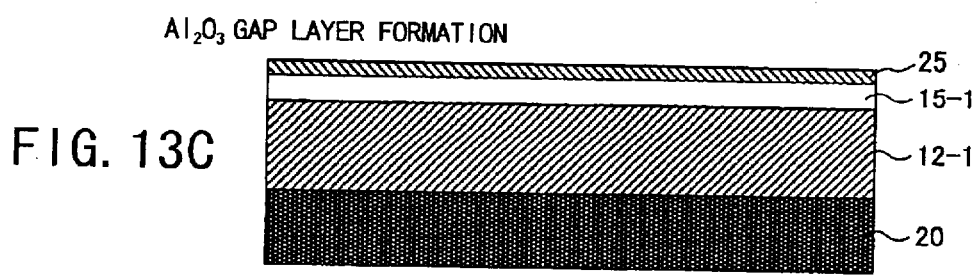
FIG. 13D FeCoMo FILM FORMATION BY SPUTTERING
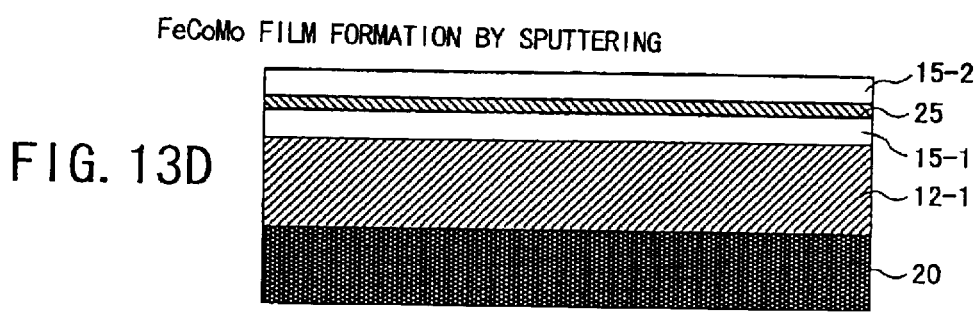

PATTERN FORMATION BY USING A RESIST

PLATING (CoNiFe, NiFe)

REMOVING THE RESIST

ETCHING : FORMING AN END-PORTION MAGNETIC POLE

SOFT MAGNETIC FILM OF FECOMO HAVING A HIGH SATURATION FLUX DENSITY, A MODERATE SOFT MAGNETISM AND A UNIAXIAL MAGNETIC ANISOTROPY

BACKGROUND OF THE INVENTION

1. Field of the Invention

The present invention generally relates to a magnetic material usable in an inductive head performing a magnetic recording to such a magnetic recording medium as a hard disk, and, more particularly, to a soft magnetic film having not only a high saturation flux density but also a good soft magnetism and an anisotropic magnetic field, as well as a good thermal stability and a corrosion resistivity.

2. Description of the Related Art

As a magnetic recording medium has been provided with a higher recording density, a coercive force in a magnetic layer in the medium has been increasing. Therefore, a magnetic material of a recording inductive head used in a magnetic disk device is required to have a high saturation flux density so as to enhance a magnetic field for writing information (writing magnetic field). Conventionally, a plated permalloy, such as $Ni_{80}Co_{20}$ or $Ni_{45}Fe_{55}$, is widely used as a magnetic pole of the inductive head, and a saturation flux density Bs of the permalloy is approximately 1–1.6T (tesla).

Additionally, Japanese Laid-Open Patent Application No. 11-74122 (Japanese Patent No. 2821456) proposes a material for a magnetic pole by enhancing the saturation flux density Bs close to 2T in CoNiFe. Henceforth, however, a recording density is surely to be made still higher, thus it is expected that there will be still increasing needs for a magnetic-pole material having a even higher saturation flux density Bs.

By the way, iron-cobalt (Fe—Co) alloys are generally known as materials having a high saturation flux density Bs. However, it is extremely difficult to achieve a soft magnetism with a composition that has a saturation flux density Bs exceeding 2T. For example, Japanese Laid-Open Patent Application No. 11-121232 discloses a technology which achieves soft magnetism in a state in which a microcrystalline phase comprising Co and other ferromagnetic 3d transition metals (Fe, Ni) exists in an amorphous phase composed mainly of various metallic elements (M) and oxygen (O).

This technology sets forth that equal to or more than 20 at % of nonmagnetic elements (the above-mentioned metallic elements (M) and oxygen (O)) need to be added so as to generate an amorphous phase to a certain extent. Conversely, however, in order to realize a saturation flux density Bs equal to or more than 2T, the addition of nonmagnetic elements needs to be restrained as much as possible.

Thus, it is extremely difficult to realize a soft magnetic material having a high saturation flux density Bs equal to or more than 2T.

Additionally, Japanese Laid-Open Patent Application No.9-115729 reports a soft magnetic material comprising a ceramic phase and a ferromagnetic hyperfine microcrystalline phase. However, it is also difficult to achieve a high saturation flux density Bs because the soft magnetic material that comprises the ceramic phase has a small magnetic moment.

Further, page 691 of the Journal of the Magnetics Society of Japan, vol. 24 (2000), discusses a Fe—Co—Al—O film manufactured by applying a magnetic field in the formation thereof. According to this journal, with a composition having a sparse proportion of nonmagnetic elements of aluminum (Al) and oxygen (O) which are restricted to 10 at % and 12 at %, respectively, an anisotropic magnetic field Hk becomes zero so as to make it difficult to obtain a uniaxial magnetic anisotropy.

Further in addition, Japanese Laid-Open Patent Application No. 10-270246 reports on a soft magnetic film having an anisotropic magnetic field (Hk>20 Oe), a resistivity (p>50 $\mu\Omega$cm), and a saturation flux density (Bs>1.6T). However, in order to enhance the resistivity equal to or more than 50 $\mu\Omega$cm, the content of nonmagnetic elements other than magnetic elements needs to be increased. Consequently, the saturation flux density Bs decreases, as described above; thus, it is difficult to achieve a high saturation flux density Bs exceeding 2T. Further, a moderate anisotropic magnetic field Hk cannot be obtained, either.

As heretofore described, it is extremely difficult to form a soft magnetic film having not only a high saturation flux density Bs as well as a high resistivity, but also an appropriate soft magnetism and a moderate anisotropic magnetic field Hk.

These strict conditions imposed on a soft magnetic film are a reflection of strict conditions imposed on a magnetic head used for recording. In other words, as a magnetic disk device is provided with a higher recording density, a magnetic recording head is required to have magnetic properties as described above.

A soft magnetic film is required to have a high saturation flux density Bs, as described above, so as to intensify a writing magnetic field to write to a magnetic recording medium, in accordance with a highly dense recording.

Additionally, this soft magnetic film is often formed as a magnetic yoke functioning as a magnetic path that leads a writing magnetic field generated by coils to a recording medium. This magnetic yoke is required to have a high resistivity. Accordingly, the soft magnetic film is required to have a high resistivity as a further condition.

However, in accordance with a recent remarkable increase in recording density, the width of an end portion of the yoke as a magnetic pole has been becoming submicron. With this shape in which the width of the end portion of the magnetic pole is equal to or thinner than the thickness of the outer layer, a loss due to an overcurrent becomes, an amount that can be ignored. Therefore, the resistivity does not have to be enhanced very much at the end portion for the yoke; rather, a saturation flux density Bs should be increased in the first place.

It is noted that, when the resistivity becomes low at the end portion of the yoke, a design change is possible so as to secure a high resistivity in the yoke as a whole.

Further, the recording inductive head is often formed as a complex magnetic head arranged with a reproducing head used for reading. A soft magnetic film used for recording in this complex magnetic head requires further considerations with respect to influences of temperatures in an annealing process in manufacturing steps thereof, in addition to the above-mentioned conditions.

Specifically, in forming the soft magnetic film used in the inductive head, considerations have to be made so as not to deteriorate properties of a magnetoresistive element used in the reproducing head. It is pointed out in general that, in forming the soft magnetic film used in the inductive head, annealing the soft magnetic film at a temperature exceeding 300° C. deteriorates the magnetoresistive element of the reproducing head.

For that reason, it is preferred that the soft magnetic film used in the inductive head has a soft magnetism at the formation thereof, and is thermally stable under approximately 300° C., or that the soft magnetic film has magnetic characteristics such that the soft magnetism is improved by being annealed at 300° C. or lower.

Therefore, a soft magnetic film disclosed in Japanese Laid-Open Patent Application No. 5-148595 is inappropriate as a magnetic-pole material used in a writing (inductive) head combined with a GMR reading (reproducing) head, because the soft magnetic material is annealed at 500–700° C. to improve a soft magnetism thereof, as a result of which a reading property thereof is deteriorated.

Additionally, a thin-film material used therein is composed of elements analogous with the elements mentioned in Japanese Laid-Open Patent Application No. 11-121232, in which a ferromagnetic microcrystalline phase and a surrounding amorphous phase inferably form a crystal structure. A conceivable reason why the soft magnetism is improved at high temperatures of 500–700° C. as mentioned above is that a structural relaxation and a phase change do not occur unless an activation energy corresponding to these temperatures is applied to a metastable phase comprising the ferromagnetic microcrystalline phase and the amorphous phase.

As heretofore described, there are a lot of conflicting requirements for a soft magnetic film used in an inductive head, and it is extremely difficult to meet these requirements.

SUMMARY OF THE INVENTION

It is a general object of the present invention to provide an improved and useful soft magnetic material in which the above-mentioned problems are eliminated.

A more specific object of the present invention is to provide a soft magnetic material having a high saturation flux density Bs and exhibiting a preferably soft magnetic property immediately after being deposited or after being annealed at a low temperature.

In order to achieve the above-mentioned objects, there is provided according to one aspect of the present invention a soft magnetic film comprising Fe, Co, a metallic element (M), and oxygen (O), the soft magnetic film being represented by a composition formula of $(Fe_{1-a}Co_a)_xM_yO_z$, wherein the metallic element (M) is one selected from a group consisting of Al, B, Ga, Si, Ge, Y, Ti, Zr, Hf, V, Nb, Ta, Cr, Mo, W, Rh, Ru, Ni, Pd and Pt, the composition formula fulfills the following conditions: a=0.05–0.65;

y=0.2–9 at %, z=1–12 at %, and y+z=<15 at %; and x=(100−y−z) at %, and a crystal structure is formed by having a bcc phase as a principal phase, the bcc phase having a crystal grain not exceeding 50 nm in diameter, and the bcc phase including a solid solution of the metallic element (M) and the oxygen (O).

Additionally, in the soft magnetic film according to the present invention, the metallic element (M) may be an alloy composed of at least two selected from the group.

According to the present invention, the soft magnetic film is mainly composed of FeCo, added with nonmagnetic elements including a metallic element (M) and O. When the amount of the nonmagnetic elements is made equal to or smaller than 15 at %, along with the foregoing conditions being fulfilled, the soft magnetic film has a high saturation flux density Bs exceeding 2.1T so as to preferably form a writing magnetic field in an inductive head.

Additionally, in the soft magnetic film according to the present invention, a uniaxial magnetic anisotropy may be provided upon a formation thereof.

Additionally, in the soft magnetic film according to the present invention, a coercive force may be decreased by being annealed at a temperature lower than 300° C. after a formation thereof.

According to the present invention, the soft magnetic film can be formed to have a preferable anisotropic magnetic field Hk. In addition, the soft magnetic film is thermally stable immediately after being formed, or after being annealed at 300° C. or lower. When annealed preferably, the coercive force decreases so as to improve the soft magnetism. The soft magnetic film is also excellent in corrosion resistance.

Additionally, the soft magnetic film according to the present invention may further comprise an anisotropic microstructure.

Additionally, in the soft magnetic film according to the present invention, the anisotropic microstructure may have a major axis shorter than 50 nm, and a minor axis shorter than the major axis.

According to the present invention, the soft magnetic film has an anisotropic microstructure so as to have the uniaxial magnetic anisotropy from the formation of the film.

Additionally, in the soft magnetic film according to the present invention, an electrical resistivity may be equal to or lower than 50 $\mu\Omega$cm.

According to the present invention, the soft magnetic film exhibits a saturation flux density Bs higher than any conventional soft magnetic film, but allows the resistivity to become lower than 50 $\mu\Omega$cm. In this respect, the soft magnetic film according to the present invention is different from a conventional soft magnetic film that has a saturation flux density decreased so as to gain a high resistivity.

Additionally, the soft magnetic film according to the present invention may further comprise a different magnetic film laminated on at least one of an upper surface and an under surface thereof so as to form a composite film structure.

According to the present invention, the soft magnetic film is not only used as a single layer, but also can be used as a preferable composite film having a magnetic film of a different type arranged on and/or under the soft magnetic film.

In order to achieve the above-mentioned objects, there is also provided according to another aspect of the present invention a magnetic recording head comprising:

a soft magnetic film used in one of a whole magnetic pole and an end of the magnetic pole near a gap, the soft magnetic film containing Fe, Co, a metallic element (M), and oxygen (O) and being represented by a composition formula of $(Fe_{1-a}Co_a)_xM_yO_z$, wherein the metallic element (M) is one selected from a group consisting of Al, B, Ga, Si, Ge, Y, Ti, Zr, Hf, V, Nb, Ta, Cr, Mo, W, Rh, Ru, Ni, Pd and Pt, the composition formula fulfills the following conditions: a=0.05–0.65;

y=0.2–9 at %, z=1–12 at %, and y+z=<15 at %; and x=(100−y−z) at %, and a crystal structure is formed by having a bcc phase as a principal phase, the bcc phase having a crystal grain not exceeding 50 nm in diameter, and the bcc phase including a solid solution of the metallic element (M) and the oxygen (O).

Additionally, in the magnetic recording head according to the present invention, the metallic element (M) may be an alloy composed of at least two selected from the group.

According to the present invention, magnetic information can be recorded on a magnetic recording medium with high density. That is, in a case where a sub-magnetic pole is provided at an end of a magnetic yoke, the whole sub-magnetic pole may be formed by the soft magnetic film, or an end of the sub-magnetic pole near a gap may be formed by the soft magnetic film.

Other objects, features and advantages of the present invention will become more apparent from the following detailed description when read in conjunction with the accompanying drawings.

BRIEF DESCRIPTION OF THE DRAWINGS

FIG. 6 comparatively shows coercive forces in the magnetization-easing axial direction of the soft magnetic film according to the embodiment of the present invention as a single layer, and coercive forces in the magnetization-easing axial direction of laminated films containing the soft magnetic film according to the embodiment of the present invention;

FIG. 11 shows a stress and an anisotropic magnetic field of the soft magnetic films according to the embodiment of the present invention;

FIG. 13A to FIG. 13D are first to fourth illustrations showing examples of steps of manufacturing the inductive head shown in FIG. 12;

DETAILED DESCRIPTION OF THE PREFERRED EMBODIMENTS

A description will now be given, with reference to the drawings, of embodiments according to the present invention.

A soft magnetic film according to the present invention is composed of iron (Fe), cobalt (Co), a metallic element (M), and oxygen (O), and is represented by a composition formula of $(Fe_{1-a}Co_a)_x M_y O_z$.

The above-mentioned metallic element (M) may be one selected from a group consisting of Al, B, Ga, Si, Ge, Y, Ti, Zr, Hf, V, Nb, Ta, Cr, Mo, W, Rh, Ru, Ni, Pd and Pt, or may be an alloy composed of at least two selected from this group.

Each of a, x, y and z in the above-mentioned composition formula of $(Fe_{1-a}Co_a)_x M_y O_z$ ranges as follows.

a=0.05–0.65
y=0.2–9 at %, z=1–12 at %, y+z=<15 at %
x=(100-y-z) at %

The above-specified soft magnetic film has a bcc phase as a principal phase in a crystal structure thereof, the bcc phase having a crystal grain not exceeding 50 nm in diameter, and is formed in a state in which the metallic element (M) and the oxygen (O) form a solid solution in the bcc phase.

In addition, this soft magnetic film has an excellent characteristic of having a saturation flux density Bs higher than 2.1T, and also has preferable magnetic characteristics as a soft magnetic film for use in an inductive head, as described hereinafter.

First, a description will be given of a foundation why the soft magnetic film according to the present invention is specified by the above-mentioned composition formula.

According to research conducted by a group including inventors of the present invention, when "a" in the principal frame of $Fe_{1-a}Co_a$ was out of the range of "a=0.05–0.65", the saturation flux density Bs of a binary alloy of FeCo became equal to or lower than 2.1T. Additionally, when the added amount of M—O is equal to or more than 15 at %, the saturation flux density Bs decreases further, although a resistivity ρ becomes equal to or more than 50 μΩcm. The limit of the added amount of the metallic element (M) is 9 at %, and the limit of the added amount of the oxygen (O) is 12 at %.

On the other hand, it was ascertained that, when the amount of the metallic element (M) was less than 0.2 at %, and the amount of the oxygen (O) was less than 1 at %, the magnetic anisotropy became difficult to control, and the corrosion resistivity also became influenced.

Hereinbelow, a description will be given of an embodiment employing Al as the metallic element (M) of the soft magnetic film according to the present invention so as to clarify features thereof.

Figure 1:
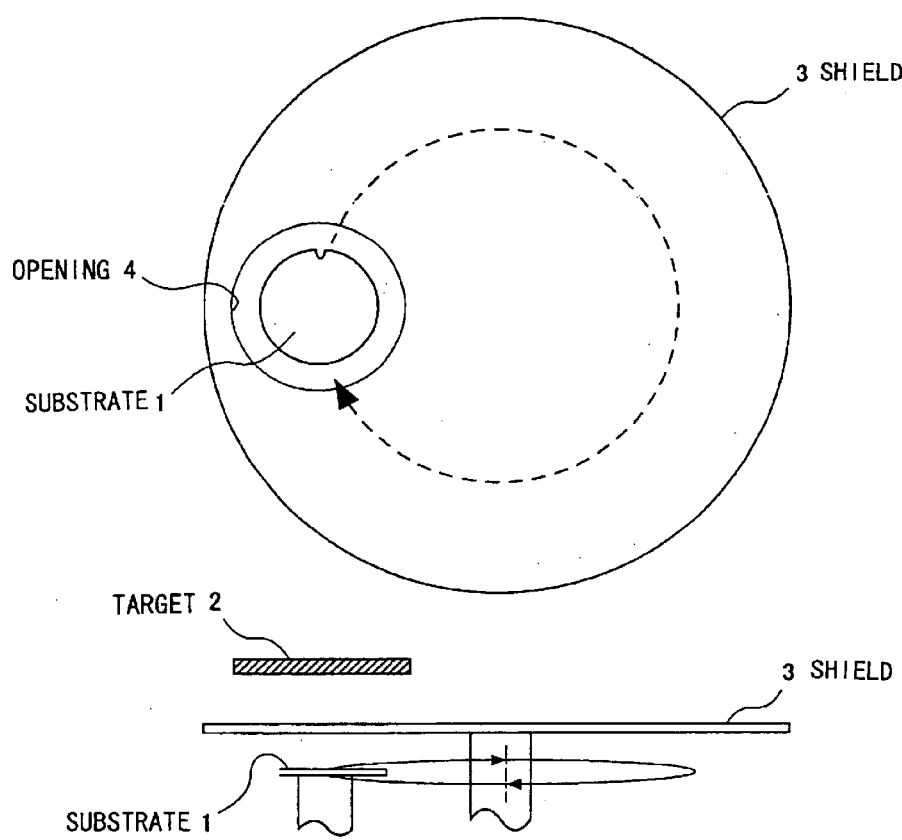
FIG. 1 shows an RF magnetron sputter device performing a revolution-film-deposition.

The soft magnetic film according to the present embodiment was deposited by using an RF magnetron sputter device performing a revolution-film-deposition as shown in FIG. 1, which device used an alloy target formed by sintering a powder of $Fe_{0.8}Co_{0.2}$ (at %) and a powder of $Al_2O_3$ as M—O, with introducing only argon gas (Ar). The $Al_2O_3$ composition in the alloy target was adjusted in a range of 1–10 at %. A power supply was 3–9 w/cm². A sputtering pressure was 0.2–0.9 Pa. A flux of argon gas was 50 sccm.

In the RF magnetron sputter device shown in FIG. 1, a substrate 1 revolves and periodically passes under an opening 4 formed in a shield 3 so that a material struck out from a target 2 is deposited as a thin film on the substrate 1.

As for the above-mentioned magnetic powder of FeCo, it was ascertained that substantially the same results can be attained with respect to the Co-atomic proportion "a" varying in the range of "a=0.05–0.65". It has also been ascertained that substantially the same results can be attained by using an alloy formed by sintering the magnetic powder of FeCo with a metal oxide (M—O) composed of the oxygen (O) and a metallic element (M) other than the above-mentioned Al.

Further, substantially the same results can be attained in a case where an FeCoM alloy target is sputtered by reactive sputtering in a Ar+$O_2$ compound gas, and in a case of using a composite target in which an oxide chip is placed on an FeCo alloy target.

Next, a description will be given of the soft magnetic (FeCoAlO) film according to the present embodiment when deposited on a water-cooled substrate.

In the following, magnetic characteristics were measured by using a vibration sampling magnetometer (VSM: Digital Measurement systems; Model 1660) and a B-H loop tracer (shb B-H curve tracer 109). Electrical resistances were measured by a direct-current four-terminal method.

Structural analysis was performed by an X-ray diffraction XRD (Rigaku Corporation RINT-1000) using a Cu—K α ray. Compositional analysis was performed by using an energy-dispersive X-ray machine (EDS: made by Oxford corporation) and an electronic probe microanalyzer (EPMA: JEOL Ltd. JXA-6900). A crystal composition of the film was observed by using a transmission electron microscope (TEM: JEOL Ltd. JEM-2000EX). A qualitative analysis of compositions in a grain and a grain boundary was performed by using an energy-dispersive X-ray analysis EDS, in which a diameter of an electron beam was approximately 3 nmφ.

Figure 2:
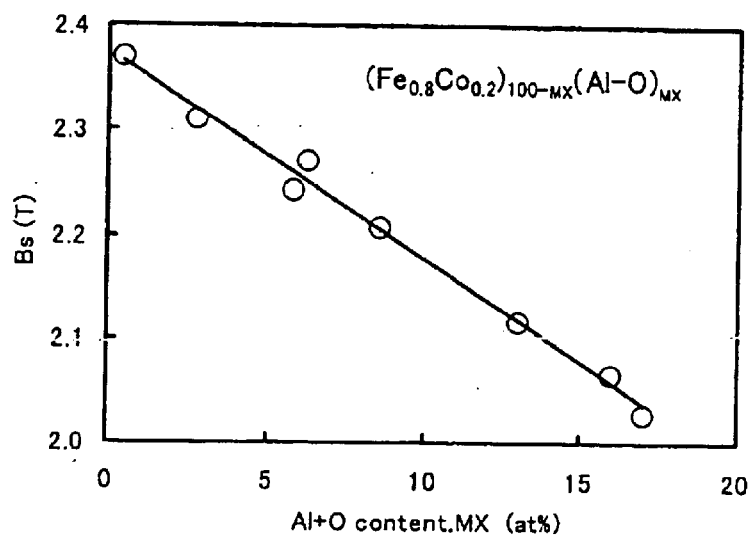
FIG. 2 shows a relationship between a saturation flux density and an (Al+O) content in a soft magnetic film according to an embodiment of the present invention.

FIG. 2 shows a relationship between the saturation flux density Bs and an (Al+O) content MX in the soft magnetic film (($Fe_{1-a}Co_a)_xAl_yO_z$ (a=0.2, x=100−y−z)) according to the present embodiment. FIG. 2 illustrates a dependency of the saturation flux density Bs on the (Al+O) content MX which is (y+z) in the above-mentioned composition formula.

As shown in FIG. 2, when the (Al+O) content MX exceeds 15 at %, the saturation flux density Bs becomes equal to or lower than 2.1T. Thus, it is ascertained that the (Al+O) content MX in the soft magnetic film is required not to exceed 15 at %.

Figure 3:
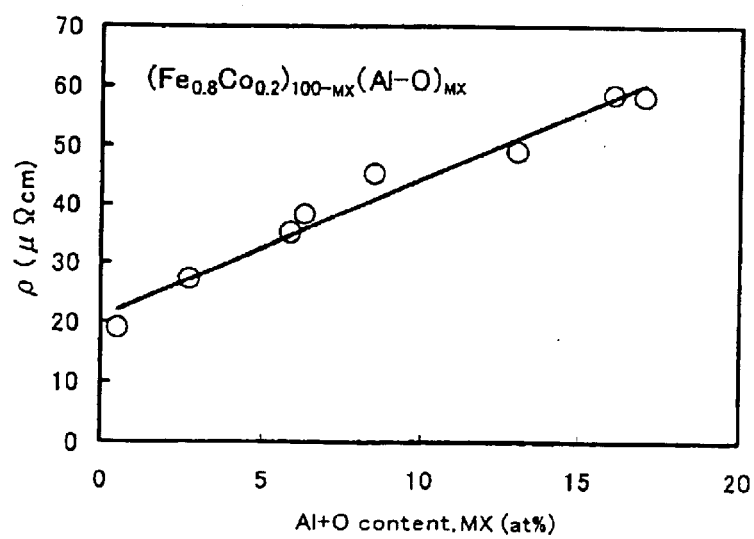
FIG. 3 shows a relationship between a resistivity and the (Al+O) content in the soft magnetic film according to the embodiment of the present invention.

FIG. 3 shows a relationship between the resistivity ρ and the (Al+O) content MX in the above-mentioned soft magnetic film. FIG. 3 illustrates a dependency of the resistivity ρ on the (Al+O) content MX.

As shown in FIG. 3, when the (Al+O) content MX is lower than 15 at %, the resistivity ρ becomes lower than 50 μΩcm. The soft magnetic film according to the present embodiment is not designed to obtain a high resistivity, unlike a conventional soft magnetic film, but is designed primarily to obtain a high saturation flux density Bs. Therefore, the resistivity ρ is allowed to become lower than 50 μΩcm.

By the way, the addition of Al is more likely to decrease the saturation flux density Bs than the addition of the oxygen (O). Therefore, the maximum limits of added amounts of Al and the oxygen (O) are different. Thus, it is preferred that the maximum limit of the added amount of Al is 9 at %, and the maximum limit of the added amount of the oxygen (O) is 12 at %.

Figure 4:
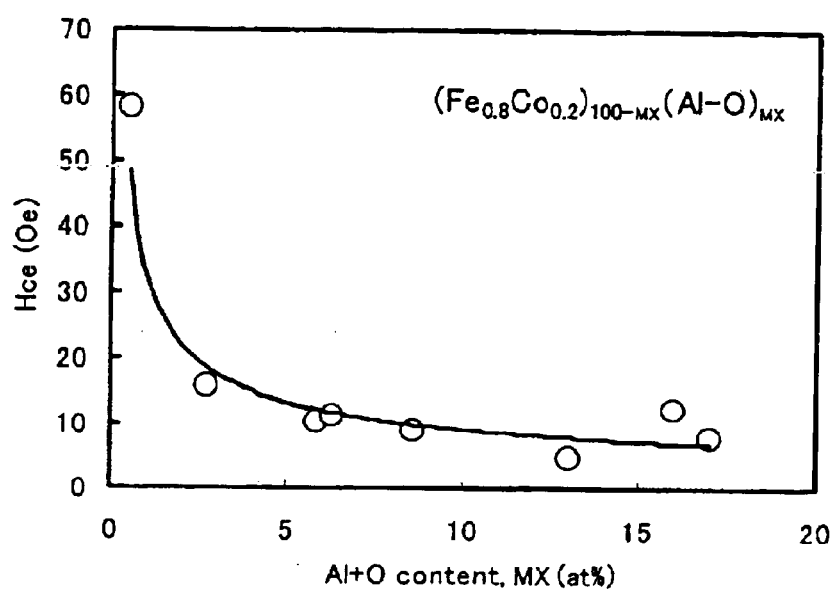
FIG. 4 shows a relationship between a coercive force measured in a magnetization-easing axial direction and the (Al+O) content MX in the soft magnetic film according to the embodiment of the present invention.

FIG. 4 shows a relationship between a coercive force Hce and the (Al+O) content MX in the above-mentioned soft magnetic film. The coercive force Hce is measured with respect to the soft magnetic film in an axial direction that facilitates magnetization (hereinafter referred to as magnetization-easing axial direction).

According to FIG. 4, in a case of a soft magnetic film containing neither Al nor oxygen (O), the coercive force Hce becomes as large as approximately 60 Oe. However, when Al and oxygen (O) are added, the coercive force Hce is reduced to approximately 10 Oe.

Thus, it is ascertained that the addition of Al and oxygen (O) contributes to improving the soft magnetism of the soft magnetic film according to the present embodiment.

According to an examination conducted by a group including inventors of the present invention, the added amounts of Al and oxygen (O) necessary to improve the soft magnetism are approximately 0.2 at % and 1 at %, respectively.

Figure 5A:
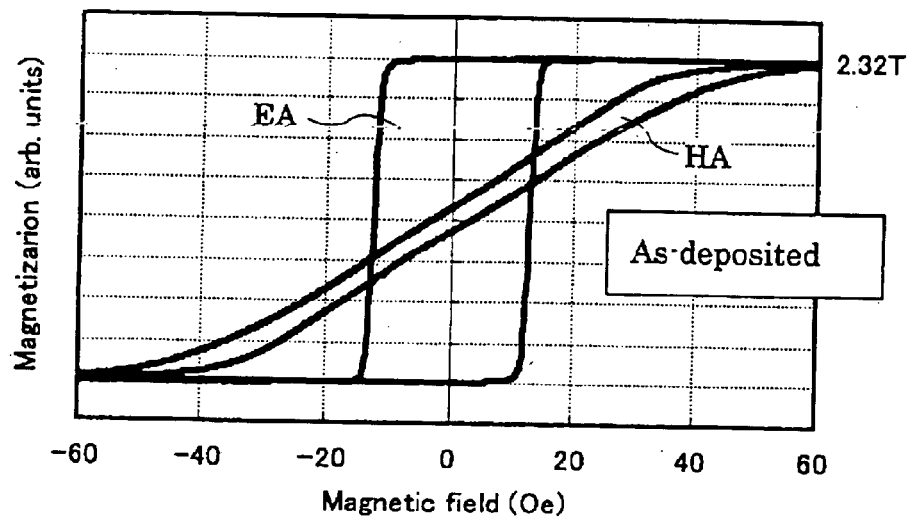
FIG. 5A shows magnetization curves measured in a magnetization-hindering axial direction and a magnetization-easing axial direction of a soft magnetic film according to the embodiment of the present invention, immediately after deposited.
Figure 5B:
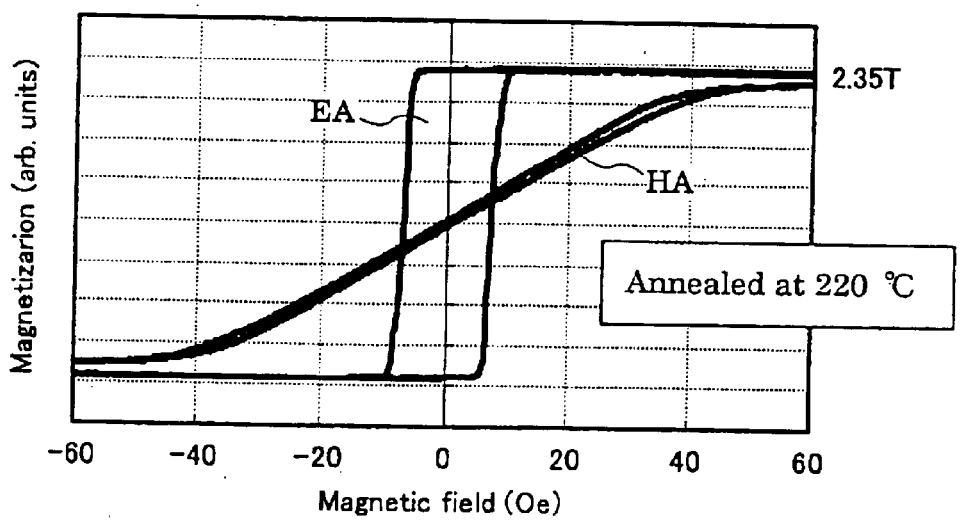
FIG. 5B shows magnetization curves measured in the magnetization-hindering axial direction and the magnetization-easing axial direction of the soft magnetic film according to the embodiment of the present invention, after annealed.

FIG. 5A shows a magnetization curve HA measured in a magnetization-hindering axial direction and a magnetization curve EA measured in the magnetization-easing axial direction of a soft magnetic film composed of $Fe_{77.7}Co_{19.5}Al_{0.6}O_{2.2}$ made on an experimental basis according to the present embodiment, immediately after the soft magnetic film was deposited. FIG. 5B shows a magnetization curve HA measured in the magnetization-hindering axial direction and a magnetization curve EA measured in the magnetization-easing axial direction of the soft magnetic film composed of $Fe_{77.7}Co_{19.5}Al_{0.6}O_{2.2}$ made on an experimental basis according to the present embodiment, after the soft magnetic film was annealed at 220° C. The magnetization-hindering axial direction is an axial direction that hinders magnetization.

According to FIG. 5A and FIG. 5B, it is ascertained that annealing the soft magnetic film according to the present embodiment improves the soft magnetism thereof. As shown in the magnetization curves EA measured in the magnetization-easing axial direction, the coercive force Hce decreases from approximately 15 Oe to approximately 7 Oe. As shown in the magnetization curves HA measured in the magnetization-hindering axial direction, a coercive force Hch also decreases from approximately 4 Oe to approximately 1.3 Oe. Additionally, an anisotropic magnetic field Hk changes from 50 Oe to 40 Oe.

The saturation flux density Bs was 2.32T immediately after the soft magnetic film was deposited, as shown in FIG. 5A, and was 2.35T after the soft magnetic film was annealed at 220° C., as shown in FIG. 5B. Thus, the saturation flux density Bs is maintained, or is not substantially changed, though slightly increased, after the soft magnetic film is annealed.

When the soft magnetic film was annealed at approximately 300° C., the same results were attained. Thus, it is ascertained that the soft magnetic film has a thermal stability under 300° C.

The soft magnetic film according to the present embodiment can be effectively used as a single layer. Further, the soft magnetic film according to the present embodiment can be used in combination with other magnetic materials.

Thereupon, a description will be given of a composite film structure in which the soft magnetic film according to the present embodiment is laminated with other magnetic films.

FIG. 6 comparatively shows the coercive forces Hce in the magnetization-easing axial direction of the soft magnetic film according to the present embodiment as a single layer, and the coercive forces Hce in the magnetization-easing axial direction of laminated films containing the soft magnetic film according to the present embodiment.

In FIG. 6, from the top of the list, ① and ② are cases of the soft magnetic film as a single layer. The soft magnetic film of case ① corresponds to the soft magnetic film described above with reference to FIG. 5A. The soft magnetic film of case ② corresponds to the soft magnetic film described above with reference to FIG. 5B.

In FIG. 6, ③ shows two cases of a laminated film of the soft magnetic film according to the present embodiment plated with a permalloy NiFe thereon. ③ shows the two cases of the laminated film immediately after being deposited and after being annealed at 220° C.

In FIG. 6, ④ is a case of a laminated film containing the soft magnetic film according to the present embodiment and a permalloy NiFe sputtered thereunder. ⑤ is a case of a laminated film in which the composition of the permalloy NiFe is changed with respect to the case ④. ⑥ is a case of a laminated film containing the soft magnetic film according to the present embodiment, an permalloy NiFe formed thereon, and an permalloy NiFe formed thereunder with the changed composition.

As shown in FIG. 6, regarding the laminated films containing the soft magnetic film according to the present embodiment and the permalloy NiFe formed on and/or under the soft magnetic film, it is ascertained that the coercive forces Hce is decreased, and thus the soft magnetism is improved.

Further, as in the cases ① and ② concerning the soft magnetic film as a single layer, the cases ③ of the laminated film containing the soft magnetic film according to the present embodiment show that the soft magnetism is improved by annealing the soft magnetic film at a temperature lower than 300° C.

Using other soft magnetic films than the above-mentioned permalloy, such as CoZrNb, CoNiFe, FeAlSi, CoFeB, and FeAlO, can improve the soft magnetism as well.

Some of the factors of the improvement of the magnetism as described above are: a change in crystal orientation of the soft magnetic film (FeCoAlO) according to the present embodiment, depending on an underlying layer thereof; and a magnetic interaction between magnetic layers of different types. From the viewpoint of the crystal orientation, using an underlying layer including Ti, Ta and Cr improved the soft magnetism as well.

Figure 7:
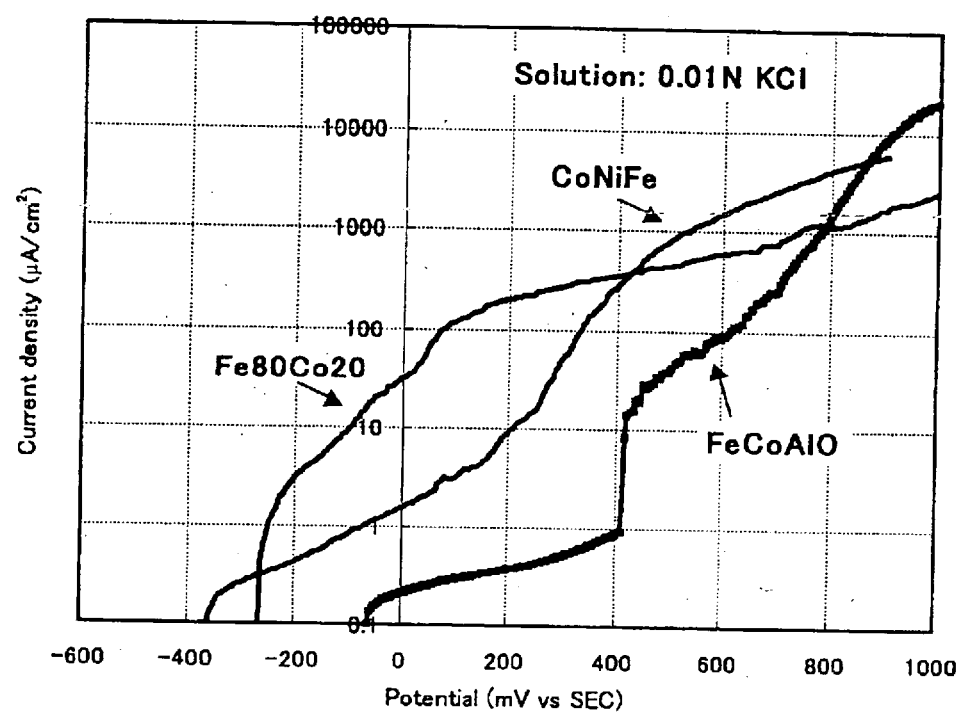
FIG. 7 shows corrosion resistivity of soft magnetic films.

FIG. 7 shows anode polarization curves measured in a KCl solution of 0.01 N. As shown in FIG. 7, whereas a binary alloy of $Fe_{80}Co_{20}$ exhibits a rest potential (RP) of −270 mV vs SEC and a pitting potential (PP) in the vicinity of 0 mV vs SEC, the soft magnetic film ($Fe_{77.7}Co_{19.5}Al_{0.6}O_{2.2}$) according to the present embodiment exhibits a rest potential (RP) of −60 mV vs SEC and a pitting potential (PP) of approximately ±400 mV vs SEC, indicating an excellent corrosion resistivity.

Besides, FIG. 7 also shows an anode polarization curve regarding a CoNiFe plating film conventionally supposed to have a high corrosion resistivity as disclosed in Japanese Laid-Open Patent Application No. 11-74122 (Japanese Patent No. 2821456). However, it is ascertained that the soft magnetic film according to the present embodiment has a higher corrosion resistivity than this conventional film.

Figure 8:
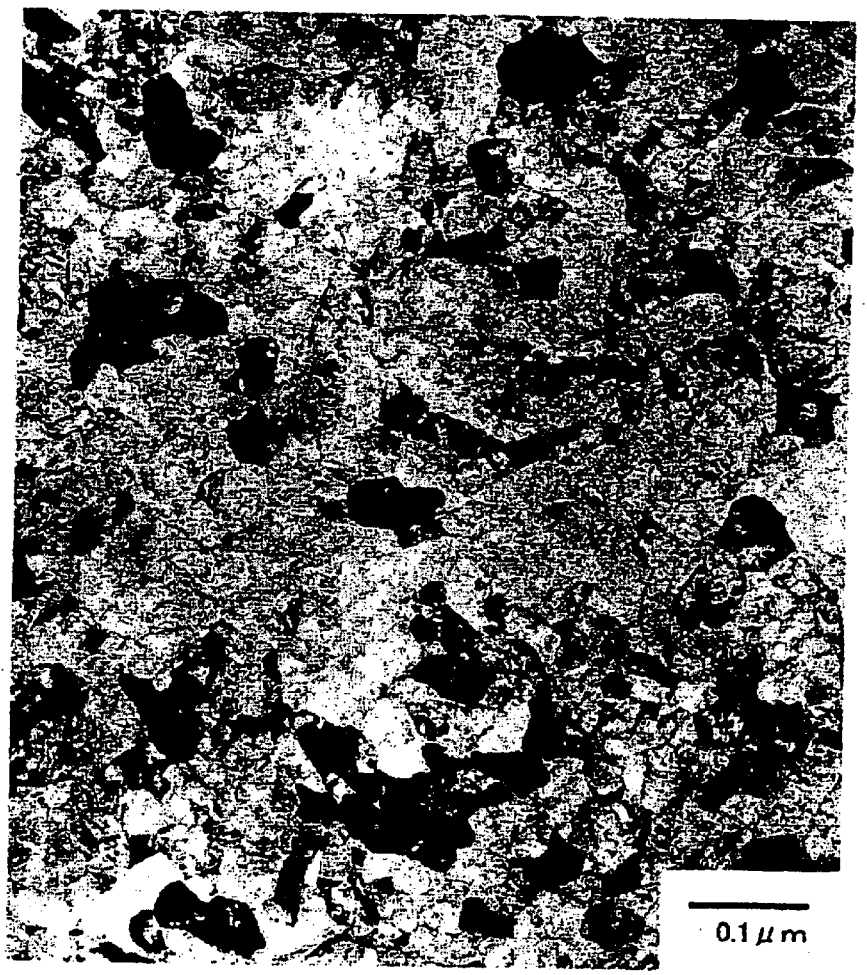
FIG. 8 shows a TEM image of the soft magnetic film according to the embodiment of the present invention.

Further, FIG. 8 shows a TEM image of the soft magnetic film ($Fe_{77.7}Co_{19.5}Al_{0.6}O_{2.2}$) according to the above-described embodiment. According to this TEM image, the diameter of a crystal grain is equal to or smaller than approximately 50 nm. According to the result of an X-ray diffraction, a diffraction peak corresponding to the bcc phase was observed.

Figure 9A:
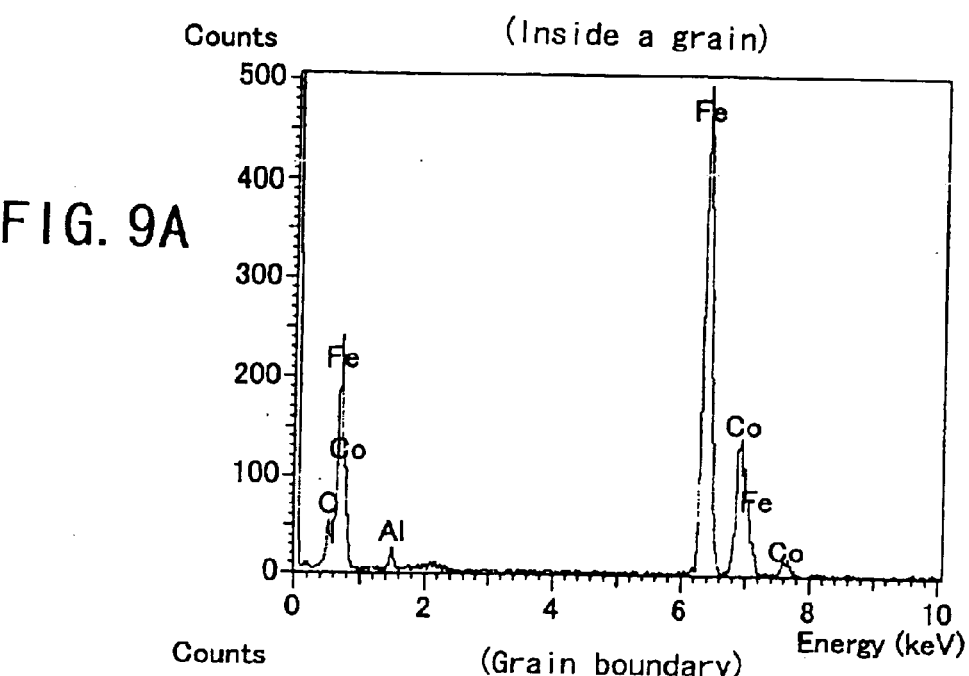
FIG. 9A and FIG. 9B show compositional analysis results regarding compositions in a crystal phase and in a grain boundary of the soft magnetic film according to the embodiment of the present invention measured by EDS.
Figure 9B:
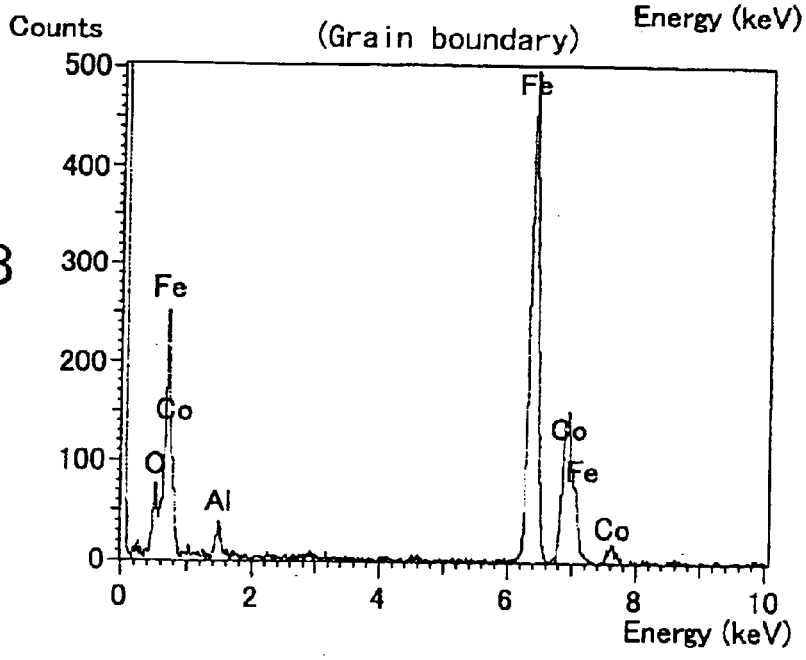

Additionally, FIG. 9A and FIG. 9B show compositional analysis results of the compositions in a crystal phase and in a grain boundary of this soft magnetic film measured by the EDS using the electron beam 3 nmφ in diameter. FIG. 9A regards inside a grain, and FIG. 9B regards the grain boundary. As shown in FIG. 9A and FIG. 9B, it is ascertained that a peak corresponding to Al and oxygen (O) is detected also in the crystal grain, and Al and oxygen (O) form a solid solution also in the crystal phase. Such a solid solution state of Al and oxygen (O) in the crystal phase inferably contributes to enhancing the rest potential (RP) of the soft magnetic film according to the present embodiment higher than the binary alloy of FeCo.

Figure 10:
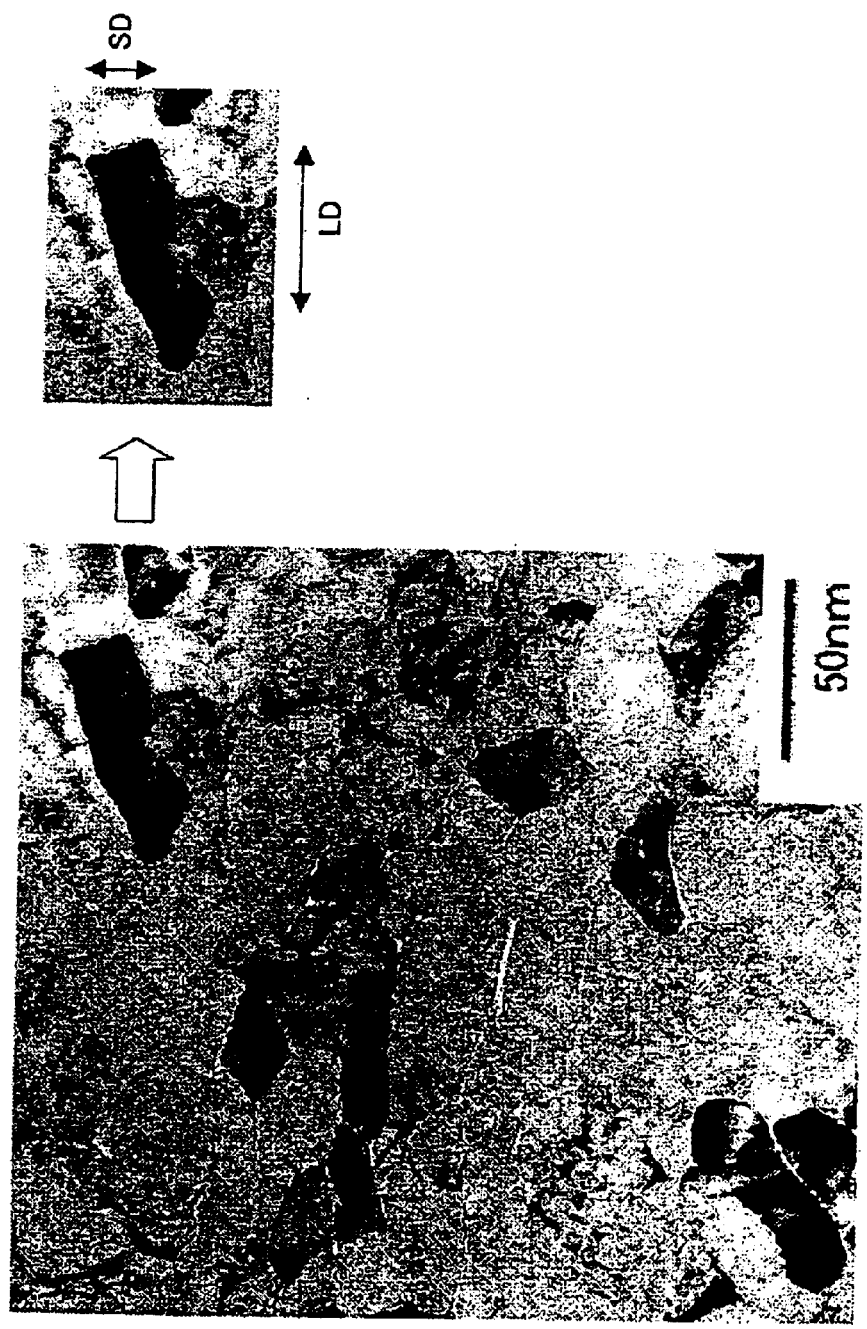
FIG. 10 is a TEM image magnifying the soft magnetic film formed without applying a magnetic field.

Further, FIG. 10 is a magnified view of a TEM image of the soft magnetic film according to the present embodiment formed without applying a magnetic field. According to this view, it is ascertained that a crystal grain has an anisotropic crystal shape (major axis LD/minor axis SD>1), and forms an anisotropic microcrystalline structure in which the major axis LD of the crystal grain is oriented along the width of the view on average. It is noted that, in the soft magnetic film according to the present embodiment, the major axis LD is equal to or shorter than 50 nm.

FIG. 11 shows a stress σ and an anisotropic magnetic field Hk of the soft magnetic films according to the present embodiment. As shown in FIG. 11, the stress σ strongly depends on the sputtering pressure. Additionally, it is understood that, as the sputtering pressure falls, the anisotropic magnetic field Hk decreases relatively. Thus, it is conceivable that a magnetic elasticity according to the stress is inferably a factor of the magnetic anisotropy.

However, magnetostrictive constants of the above-mentioned films exhibit a substantially fixed value of approximately $30 \times 10^{-6}$, and, by assuming that an anisotropic energy according to a magnetic elasticity is $3/2\lambda\sigma$, and even extrapolating to σ=0, the anisotropic magnetic field Hk does not become zero. Thus, the magnetic anisotropy according to a magnetic elasticity effect alone cannot account for the uniaxial magnetic anisotropy of the soft magnetic film (FeCoAlO) according to the present embodiment.

Therefore, it is inferred that the uniaxial magnetic anisotropy is provided for the anisotropic crystal grain and the anisotropic crystal structure directly or via the stress. This inference does not contradict the results according to the TEM image.

Accordingly, the soft magnetic film according to the present embodiment has an anisotropic microstructure since the formation thereof. It can be inferred that the uniaxial magnetic anisotropy is provided for the anisotropic crystal grain and the anisotropic crystal structure directly or via a magnetic elasticity effect according to the stress.

As described in detail above, the soft magnetic film according to the present embodiment not only has a considerably high saturation flux density Bs and a moderate anisotropic magnetic field Hk, but also exhibits a preferable soft magnetism. Additionally, this soft magnetism is improved by annealing the soft magnetic film at a temperature not exceeding 300° C. which does not lead to a deterioration of a reproducing head. Therefore, the soft magnetic film according to the present embodiment is considerably effective for such use as a magnetic film used for a magnetic pole at a gap end portion of an inductive head.

Figure 12:
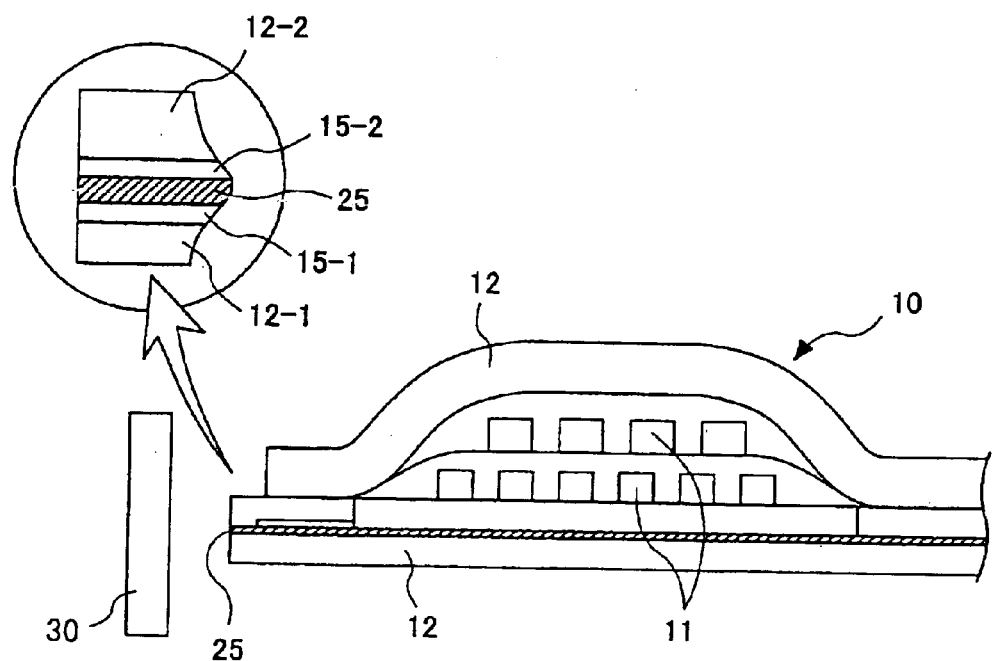
FIG. 12 outlines an inductive head for use in recording.

FIG. 12 outlines an inductive head 10 for use in recording. In this inductive head 10, a writing magnetic field generated at coils 11 writes magnetic information to an external magnetic recording medium 30 via a magnetic yoke 12. The soft magnetic film according to the present embodiment can be used in a writing gap portion of the head 10, i.e., a magnetic pole 15 at an end of the magnetic yoke 12, so as to create a strong writing magnetic field.

This enables a high-density recording corresponding to the magnetic recording medium 30 having a high density. Besides, as shown in a magnified view in FIG. 12, a lower yoke 12-1, a lower magnetic pole 15-1, a gap layer 25, an upper magnetic pole 15-2 and an upper yoke 12-2 are laminated at the end of the magnetic yoke 12.

Additionally, although FIG. 12 only shows a recording part of the head 10, arranging a reproducing head adjacent thereto can form a complex magnetic head.

In addition, the soft magnetic film used in the magnetic pole at the end of a magnetic head for use in recording may be a single layer, or may be a laminated film as described above. Further, since the head 10 is designed to obtain a predetermined resistivity in the yoke as a whole, using the soft magnetic film having a low resistivity as the magnetic pole at the end of the yoke does not cause inconvenience.

The head 10 can have a shape as shown in FIG. 12, by using a thin-film forming technology and a micromachining technology, in which a predetermined film is formed by such a method as sputtering, and is patterned into a predetermined shape by using a resist, and unnecessary parts are removed by a method such as liftoff, etching, and milling.

FIG. 13A to FIG. 15B show examples of steps of forming the end of the yoke 12 in a series of steps of manufacturing the inductive head 10.

In FIG. 13A to FIG. 13D, the upper surface of a substrate 20 composed of, for example, $Al_2O_3$ is plated with, for example, NiFe, CoNiFe as the lower yoke 12-1, as shown in FIG. 13A. The soft magnetic film (FeCoMO) according to the present embodiment is formed as the lower magnetic pole 15-1 on the lower yoke 12-1 by sputtering, as shown in FIG. 13B. The gap layer 25 composed of, for example, $Al_2O_3$ is formed on the lower magnetic pole 15-1, as shown in FIG. 13C. The soft magnetic film (FeCoMO) according to the present embodiment is formed as the upper magnetic pole 15-2 on the gap layer 25 by sputtering, as shown in FIG. 13D.

Figure 14A:
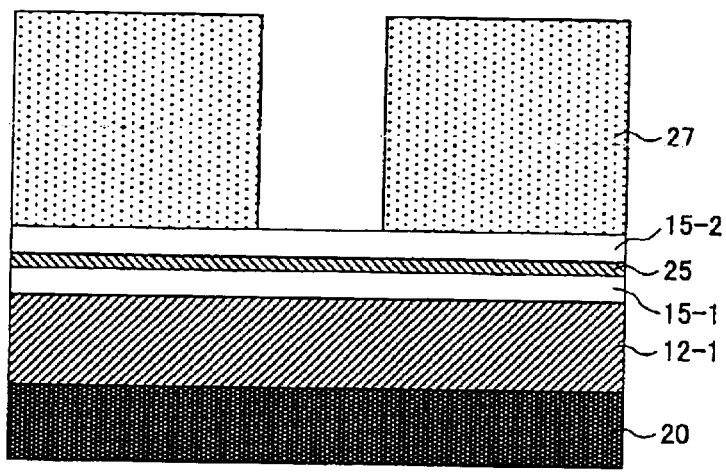
FIG. 14A and FIG. 14B are fifth and sixth illustrations of steps following the steps shown in FIG. 13D.
Figure 14B:
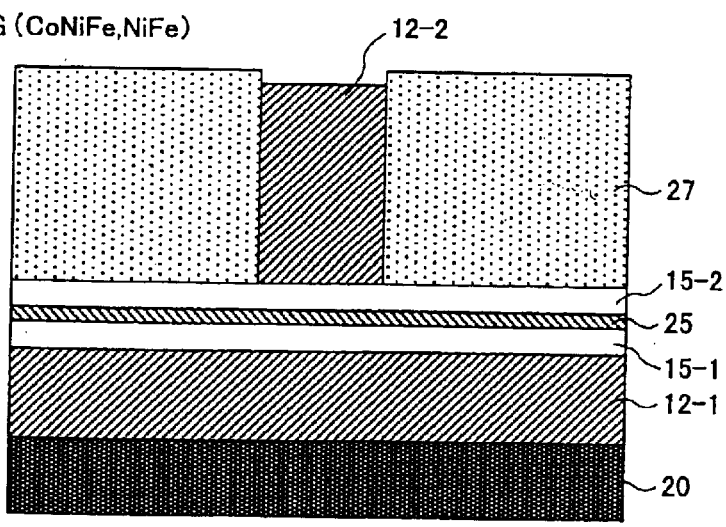

In FIG. 14A and FIG. 14B, a pattern having a predetermined shape is formed by using a resist 27, as shown in FIG. 14. Thereafter, the pattern is plated with, for example, NiFe, CoNiFe so as to form the upper yoke 12-2, as shown in FIG. 14B.

Figure 15A:
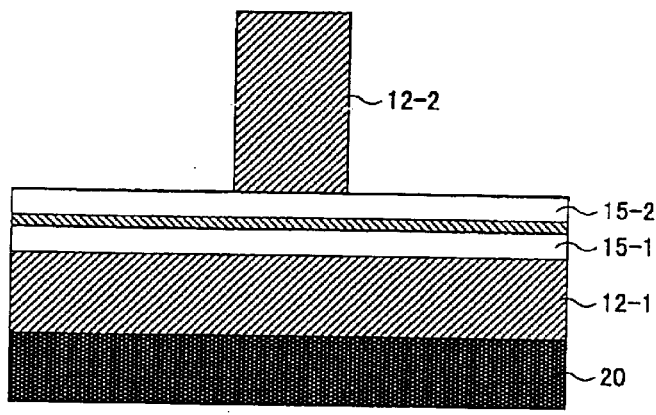
FIG. 15A and FIG. 15B are seventh and eighth illustrations of steps following the steps shown in FIG. 14B.
Figure 15B:
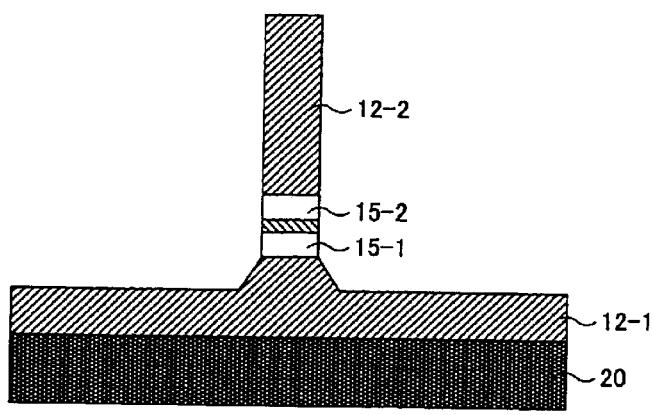

In FIG. 15A and FIG. 15B, the resist 27 is removed, as shown in FIG. 15A. Then, unnecessary parts of the lower yoke 12-1, the lower magnetic pole 15-1, the gap layer 25, the upper magnetic pole 15-2, and the upper yoke 12-2 are removed by etching, as shown in FIG. 15B. This forms the head 10 in which the lower and upper magnetic poles 15-1 and 15-2 are formed by the soft magnetic film according to the present embodiment at the end of the yoke 12 as shown in FIG. 12.

The present invention is not limited to the specifically disclosed embodiments, and variations and modifications may be made without departing from the scope of the present invention.

The present application is based on Japanese priority application No. 2001-116021 filed on Apr. 13, 2001, the entire contents of which are hereby incorporated by reference.

What is claimed is:

1. A soft magnetic film comprising Fe, Co, a metallic element (M), and oxygen (O), the soft magnetic film being represented by a composition formula of $(Fe_{1-a}Co_a)_xM_yO_z$, wherein said metallic element (M) is one selected from a group consisting of Al, B, Ga, Si, Ge, Y, Ti, Zr, Hf, V, Nb, Ta, Cr, Mo, W, Rh, Ru, Ni, Pd and Pt, said composition formula fulfills the following conditions:

a=0.05–0.65;

y=0.2–9 at %, z=1–5 at %, and y+z=<15 at %, and x=(100−y−z) at %, and a crystal structure is formed by having a bcc phase as a principal phase, the bcc phase having a crystal grain not exceeding 50 nm in diameter, and the bcc phase including a solid solution of said metallic element (M) and said oxygen (O).

2. The soft magnetic film as claimed in claim 1, wherein said metallic element (M) is an alloy composed of at least two selected from said group.

3. The soft magnetic film as claimed in claim 2, wherein a uniaxial magnetic anisotropy is provided upon a formation thereof.

4. The soft magnetic film as claimed in claim 3, further comprising an anisotropic microstructure.

5. The soft magnetic film as claimed in claim 4, wherein said anisotropic microstructure has a major axis shorter than 50 nm, and a minor axis shorter than said major axis.

6. The soft magnetic film as claimed in claim 2, wherein a coercive force is decreased by being annealed at a temperature lower than 300° C. after a formation thereof.

7. The soft magnetic film as claimed in claim 6, further comprising an anisotropic microstructure.

8. The soft magnetic film as claimed in claim 7, wherein said anisotropic microstructure has a major axis shorter than 50 nm, and a minor axis shorter than said major axis.

9. The soft magnetic film as claimed in claim 2, wherein an electrical resistivity does not exceed 50 $\mu\Omega$cm.

10. The soft magnetic film as claimed in claim 2, further comprising a different magnetic film laminated on at least one of an upper surface and an under surface thereof so as to form a composite film structure.

11. The soft magnetic film as claimed in claim 1, wherein a uniaxial magnetic anisotropy is provided upon a formation thereof.

12. The soft magnetic film as claimed in claim 11, further comprising an anisotropic microstructure.

13. The soft magnetic film as claimed in claim 12, wherein said anisotropic microstructure has a major axis shorter than 50 nm, and a minor axis shorter than said major axis.

14. The soft magnetic film as claimed in claim 1, wherein a coercive force is decreased by being annealed at a temperature lower than 300° C. after a formation thereof.

15. The soft magnetic film as claimed in claim 14, further comprising an anisotropic microstructure.

16. The soft magnetic film as claimed in claim 15, wherein said anisotropic microstructure has a major axis shorter than 50 nm, and a minor axis shorter than said major axis.

17. The soft magnetic film as claimed in claim 1, wherein an electrical resistivity does not exceed 50 $\mu\Omega$cm.

18. The soft magnetic film as claimed in claim 1, further comprising a different magnetic film laminated on at least one of an upper surface and an under surface thereof so as to form a composite film structure.

19. A magnetic recording head comprising:

a soft magnetic film used in one of a whole magnetic pole and an end of said magnetic pole near a gap, the soft magnetic film containing Fe, Co, a metallic element (M), and oxygen (O), the soft magnetic film being represented by a composition formula of $(Fe_{1-a}Co_a)_x M_y O_z$, wherein said metallic element (M) is one selected from a group consisting of Al, B, Ga, Si, Ge, Y, Ti, Zr, Hf, V, Nb, Ta, Cr, Mo, W, Rh, Ru, Ni, Pd and Pt, said composition formula fulfills the following conditions:

a=0.05–0.65;

y=0.2–9 at %, z=1–5 at %, and y+z=<15 at %; and x=(100–y–z) at %, and a crystal structure is formed by having a bcc phase as a principal phase, the bcc phase having a crystal grain not exceeding 50 nm in diameter, and the bcc phase including a solid solution of said metallic element (M) and said oxygen (O).

20. The magnetic recording head as claimed in claim 19, wherein said metallic element (M) is an alloy composed of at least two selected from said group.

21. A soft magnetic film comprising Fe, Co, a metallic element (M), and oxygen (O), the soft magnetic film being represented by a composition formula of $(Fe_{1-a}Co_a)_x M_y O_z$, wherein said metallic element (M) is one selected from a group consisting of Al, B, Ga, Si, Ge, Y, Ti, Zr, Hf, V, Nb, Ta, Cr, Mo, W, Rh, Ru, Ni, Pd and Pt, said composition formula fulfills the following conditions:

a=0.05–0.65;

y=0.2–9 at %, z=1–12 at %, and y+z=<15 at %; and x=(100–y–z) at %, and a crystal structure is formed by having a bcc phase as a principal phase, the bcc phase having a crystal grain not exceeding 50 nm in diameter, and the bcc phase including a solid solution of said metallic element (M) and said oxygen (O).

* * * * *